Dec. 28, 1943. H. N. RIDER 2,337,839
ACOUSTICAL DEVICE
Filed Oct. 19, 1942 4 Sheets-Sheet 1

Harry N. Rider
Inventor

By W. B. Harpman
Attorney

Dec. 28, 1943.     H. N. RIDER     2,337,839
ACOUSTICAL DEVICE
Filed Oct. 19, 1942     4 Sheets-Sheet 2
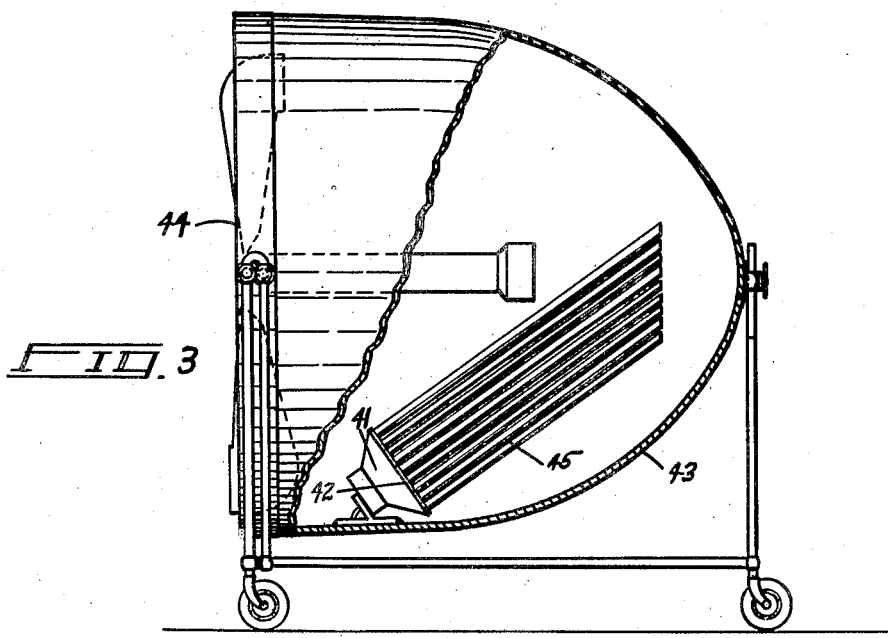
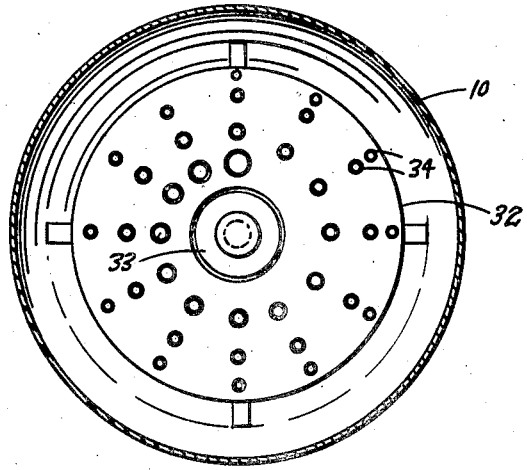
Harry N. Rider
Inventor
By W. B. Harpman
Attorney

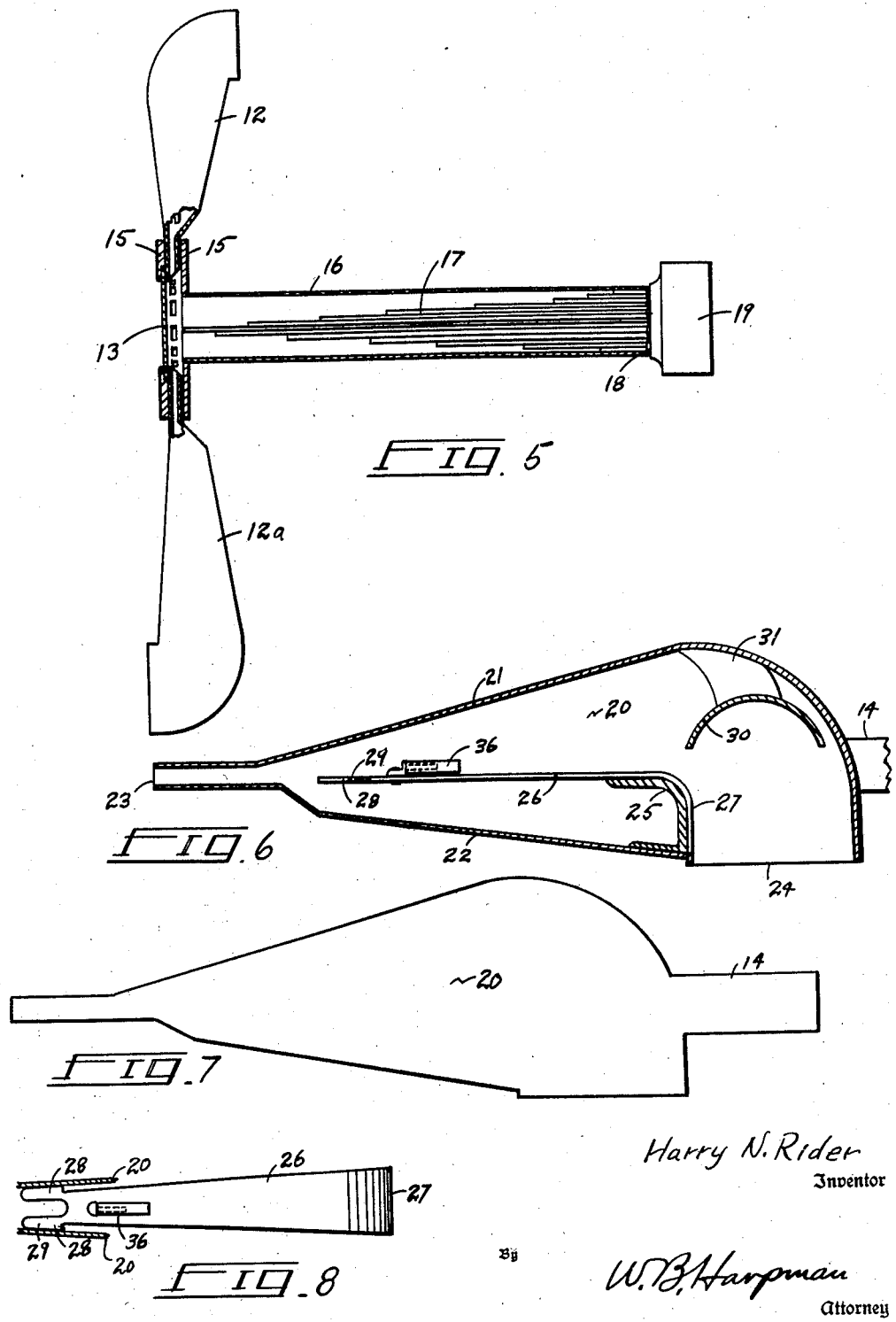

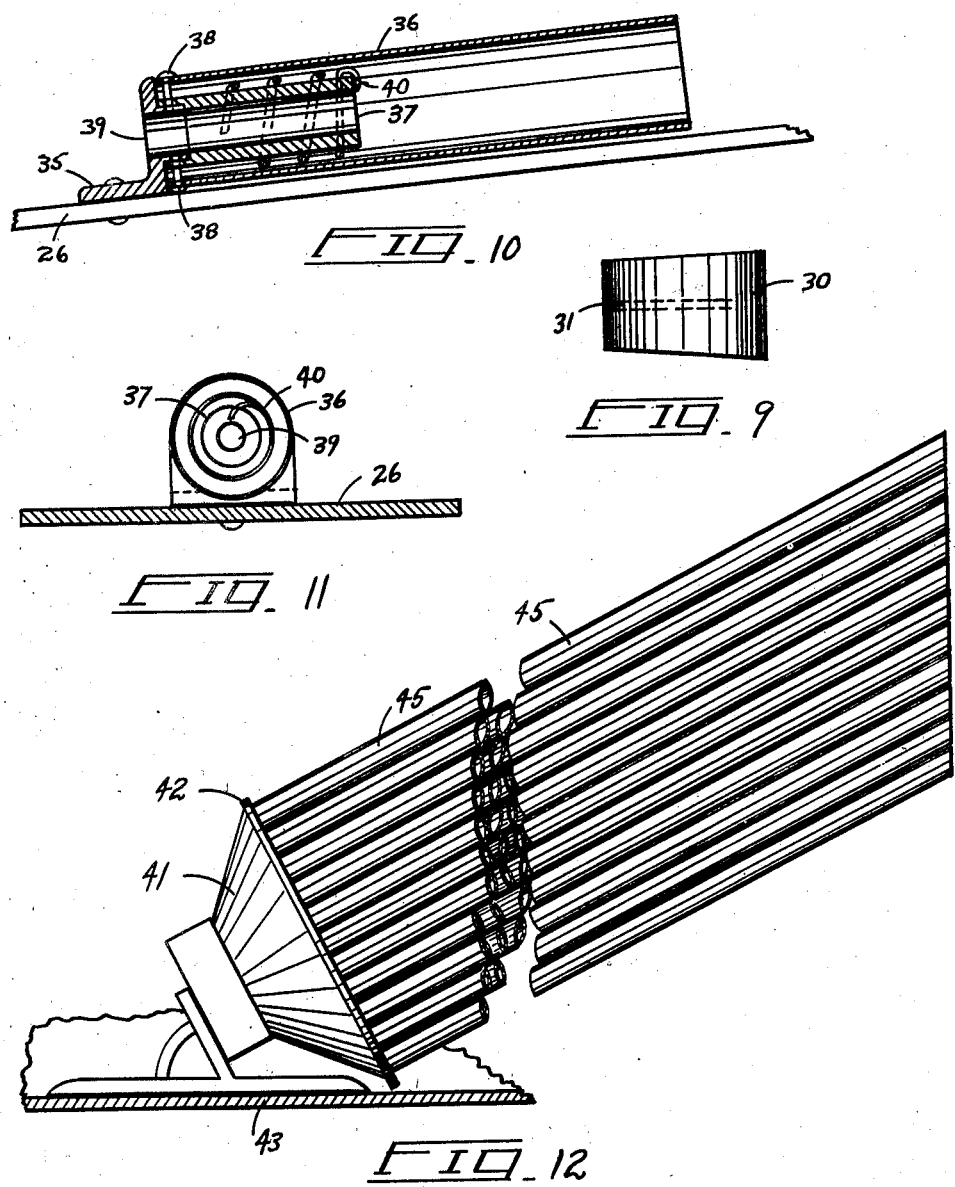

Patented Dec. 28, 1943

2,337,839

UNITED STATES PATENT OFFICE 2,337,839

ACOUSTICAL DEVICE

Harry N. Rider, Youngstown, Ohio

Application October 19, 1942, Serial No. 462,632

14 Claims. (Cl. 181—31)

The principal object of this invention is the provision of an acoustical device adapted for use especially where the intensity is required to be of heavy volume as within an auditorium or enclosure.

A further object of the invention is to provide an acoustical device for amplifying and stabilizing sound waves through a multiplicity of agents of acoustical phenomena arranged to radiate the entire audible range of sound from a common point source.

A still further object of the invention is the provision of an acoustical device for amplifying and stabilizing sound waves whereby the radiated sounds retain in amplified form the true structure and delicacy of tone existent in the originating sounds.

A still further object of the invention is the provision of an acoustical device for amplifying and stabilizing sound waves whereby the amplified radiated sounds consist of excessive resonance or depth and radiate with a high degree of intensity and clarity to the most distant parts of an auditorium as well as to the near portions thereof.

A still further object of the invention is the provision of apparatus for amplifying and stabilizing sound waves whereby the sounds radiated therefrom are of a character limiting entirely the possibility of reverberation, echo, or "dead spots" in the auditorium or enclosure into which the sounds radiate.

A still further object of the invention is the provision of apparatus for amplifying and stabilizing sound waves whereby the sounds radiated therefrom emanate from a dual channel electric amplifier, and are filtered to pass the high frequencies through one portion of the apparatus and the low frequencies through another portion of the apparatus, the sounds from both of which are delivered into a reflecting bowl and there mixed and sent out as one common point source thus radiating a single group train of sound waves thereby eliminating the possibility of emitting several sound wave trains which have the effect of creating soundless pockets in an auditorium enclosure.

The present invention relates to new and useful improvements in an acoustical device for amplifying and stabilizing sound waves particularly adapted for use within an auditorium as, for example, a motion picture theater although the invention may be also applied to sound reproduction in connection with radio receiving equipment, public address systems, intercommunicating systems and television, sound system, as well as other types of apparatus requiring the amplification and radiation of sound waves. In amplifying and radiating sounds, especially where the intensity is required to be of heavy volume as within an auditorium or enclosure of some sort, it is desirable that the radiated sound shall retain in amplified form all of the true tonal structure existent in the originating sounds at the microphone or other originating source and that they shall not lose or have added to them any foreign sound variations and further that such radiated sounds shall consist of excessive resonance or "depth," so as to radiate with the same degree of intensity and clarity to the most distant parts of an auditorium as to those portions nearby and limit entirely or reduce to a great extent the possibility of reverberation, echo, or "dead spots" in the auditorium or enclosure and have as a distinct feature the ability to create, sustain, and terminate resonance of the exact characteristics of time and quality delivered from the associated input electrical circuits.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawings, wherein,

Figure 3 is a cross sectional side elevation of a modified form of loudspeaker formed in accordance with the invention.

Figure 4 is an elevation taken on lines 4—4 of Figure 1.

Figure 5 is an enlarged view of a portion of the loudspeaker shown in Figures 1 and 2 and shows in detail the formation of portions thereof, parts being partially broken away in this view.

Figure 6 is a cross sectional side elevation of a tone chamber portion of the assembly shown in Figure 3.

Figure 7 is a side elevation of a portion of the tone chamber shown in Figure 6, Figure 8 is a top plan view of a portion of the tone chamber shown in Figure 6.

Figure 9 is a top plan view of a baffle comprising a portion of the tone chamber shown in Figure 6.

Figure 10 is a sectional side elevation of a portion of the tone chamber assembly shown in Figure 6 and comprises a resonance creating device.

Figure 11 is an end elevation of the resonance creating device shown in Figures 6 and 10.

Figure 12 is an enlarged side elevation with parts broken away showing in detail a portion of the modified form of loudspeaker shown in Figure 3.

Figure 1:
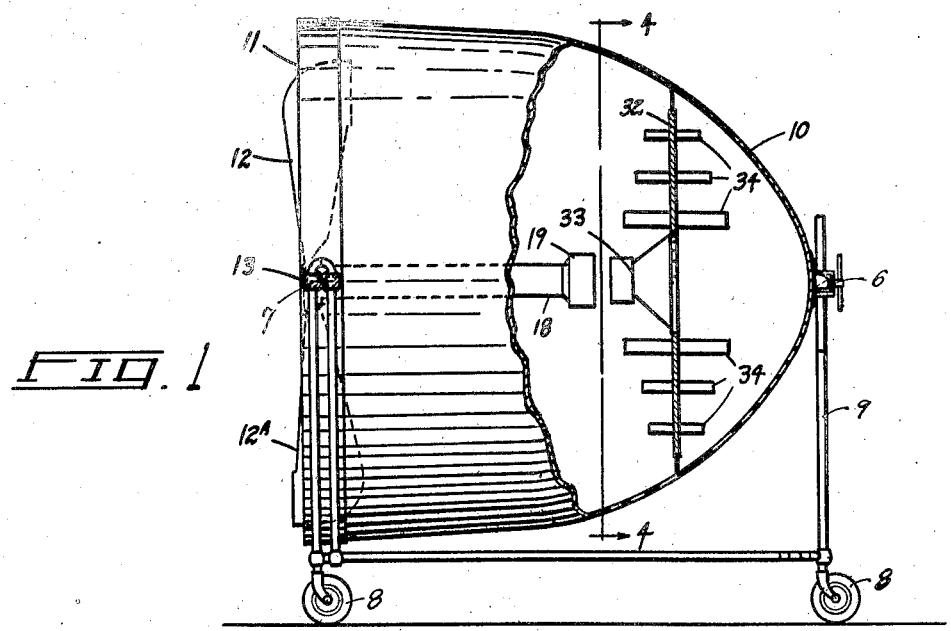
Figure 1 is a cross sectional side elevation of an acoustical device or loud speaker formed in accordance with the invention.
Figure 2:
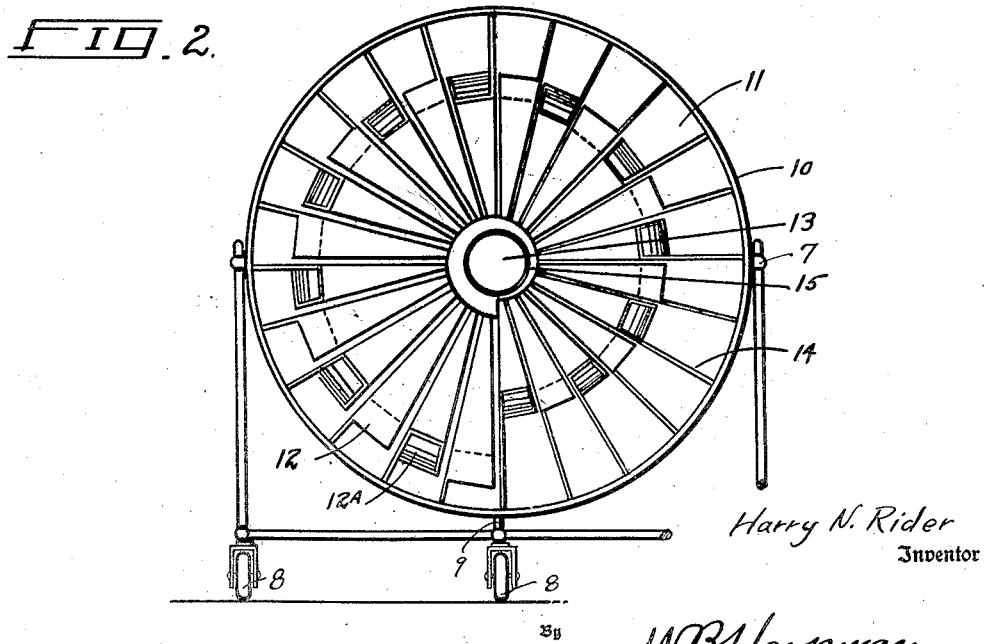
Figure 2 is a front elevation of the loudspeaker shown in Figure 1 and shows in detail the arrangement of certain portions of the loudspeaker.

By referring to Figures 1 and 2 of the drawings it will be observed that the apparatus for amplifying and stabilizing sound waves takes the form of a loudspeaker comprising a bowl 10 preferably formed of wood, plastics, metal, or other material best adapted for sound reflection and acoustical purpose, mounted upon a suitable supporting frame 9, including a plurality of wheels 8 and preferably arranged so that the loudspeaker itself may be adjustably positioned with relation to the supporting frame. Such adjustment may be made by reason of the foremost portion of the bowl 10 being positioned upon pivots 7 at either side thereof and supported at a rearmost point by a bracket and adjustable screw 6 with respect to an upward projection of the supporting frame 9. The bowl 10 is formed in a predetermined shape and size, the latter of which may obviously vary to conform to various installation requirements. In shape, the bowl 10 has a depth, as shown in Figure 1, approximately equal to the diameter of an opening 11 as shown in Figure 2 and follows a true parabolic design diverging into elongated lines toward the opening 11, similar to two-thirds of an ellipsoid. Located within the opening of the bowl 10 there are a plurality of tone chambers 12 and 12A arranged in a pattern radiating from a common center in a manner similar to spokes of a wagon wheel. These tone chambers 12 and 12A are only slightly megaphonic in design as they are purposely lacking in sufficient taper or exponential design, and hence will not deliver amplified sounds megaphonically. Still referring to Figures 1 and 2 of the drawings, it will be observed that the plurality of tone chambers 12 direct sound into the bowl 10 and the plurality of tone chambers 12A direct sound outwardly away from the bowl.

By referring to Figure 2 of the drawings it will be seen that these tone chambers 12 and 12A alternate in arrangement and it will also be seen that the various tone chambers are spaced apart from each other and that portions 14 of each of the tone chambers establish connection with the rim of the opening 11 of the bowl 10 while the various tone chambers 12 and 12A are themselves of varying lengths arranged in a definite archimedean spiral which in turn corresponds to the shape of a centrally positioned mounting member 15 against which the innermost ends of the tone chambers establish contact.

By referring now to Figures 5, 6, 7 and 8 of the drawings, enlarged detail views will be seen illustrating certain essential portions of the apparatus. In Figure 5 two of the plurality of tone chambers 12 and 12A are shown positioned about a common axis, which comprises a tubular sound communicating member 16, in a manner so that each of the plurality of tone chambers 12 and 12A communicate therewith. The sound communicating member 16 comprises a tube having positioned therein a plurality of very small tubes 17 which completely fill the tube 16, the smallest of the tubes 17 being only a few inches in length while the longest are equal to the total distance of the tube 16. The plurality of tubes 17 are of different lengths gradually varying between two extremes in length and all are arranged so that they terminate on an even plane as shown at a point 18 which is immediately adjacent an operating diaphragm of an electrical impulse receiving unit 19 which includes a voice coil and a field coil and operates upon the dynamic principle well known to the art. The flat plane 18 of the ends of the plurality of tubes 17 are positioned with respect to the operating diaphragm of the receiving unit so that the air gap therebetween is proper for the production of the highest degree of diaphragm efficiency. The tubes 17 are anchored at and suspended from their ends terminating on the plane 18 so as to be free at their opposite ends which will permit them to resonate at certain frequencies. Thus, sounds created by the diaphragm of the receiving unit 19 enter the plurality of tubes 17 and are conveyed outwardly therethrough into the forward end of the tube 16 which forms the sound communicating chamber 16 and in turn are directed outwardly into the various tone chambers 12 and 12A which in turn amplify the sounds and direct them equally into and away from the bowl 10 heretofore described. A flat drum-stretched diaphragm 13 forms, in effect, a closure for the forwardmost end of the tubular sound communicating member 16. The flat plane 18 of the ends of the plurality of relatively small tubes 17 is adjusted with respect to the air gap separating the same from the operating diaphragm of the receiving unit 19 so that the "standing waves" of different frequencies are applied against the movement of the diaphragm of the receiving unit 19 so that the distortion due to mechanical vibrations of the diaphragm is substantially eliminated and a desirable tonal quality is realized and at the same time the diaphragm is effectively "loaded" so as to obtain the greatest efficiency thereof.

By referring now to Figures 6, 7, 8 and 9 of the drawings, it will be observed that the structural details of one of the tone chambers 12 or 12A have been illustrated and by referring particularly to Figure 6 of the drawings a cross sectional elevation of one of these tone chambers 12 or 12A may be seen wherein a side member 20, as shown in elevation in Figure 7 of the drawings, has been assembled into a tone chamber by means of another side section, not shown in Figure 6, spaced apart from the member 20 by means of top and bottom sections 21 and 22, respectively. The top section 21 is preferably formed in a curving shape as shown so as to direct sounds outwardly therefrom, the sounds being introduced into the tone chamber through a relatively small entrance way 23. The bottom section 22 is relatively flat and is positioned so as to complete the tone chamber structure and provide a sound delivering opening 24. Positioned on the bottom member 22, as illustrated in Figure 6, by means of a supporting bracket 25, there is a tongue 26 which, by referring to Figure 8, may be seen in a top plan view, the bracket 25 being positioned beneath the downwardly curving end portion 27 of the tongue 26. The tongue 26 is also supported at two points adjacent its opposite end as indicated by the numeral 28 in Figures 6 and 8. The structure of the tongue adjacent these supporting points takes the form of a pair of arms 29 which permits the ready passage of sounds therebetween and over and under the tongue 26 itself as is clearly illustrated in Figure 6 of the drawings. The downwardly turned end 27 of the tongue is narrower than the tone chamber itself and thus makes possible the delivery of sounds around the supporting bracket 25. Positioned directly above or opposite the sound delivering opening 24 of the tone chamber shown in Figure 6 of the drawings there is a parabolic reflector 30 supported by means of a bracket 31 which in turn is carried on the curved top portion 21 of the tone chamber. A plan view of this reflector 30 may be seen by referring to Figure 9 of the drawings wherein the supporting bracket 31 is shown in dotted lines it being observed that the reflector, mounted on the interior wall of the tone chamber, is located directly opposite the delivery opening of the tone chamber and thus enables the tone chamber to resist the incoming pressure which, if permitted to reach the diaphragm of the receiving unit, results in objectionable diaphragm distortion. By again referring to Figure 2 of the drawings it will be observed that each of the plurality of tone chambers 12 and 12A are supported with respect to the rim of the bowl 10 by means of supporting members 14 taking, for example, the form of spokes of a wheel.

By referring now to Figures 6 and 7 it will be observed that the side section 20 illustrated in these figures forms not only one side of the tone chamber itself but that the projection 14 thereon forms a structural member extending outwardly from the tone chamber and engaging the inner surface of the bowl 10 as shown in assembled position in Figure 2 of the drawings. These structural members 20 are comparable to the spoke of a wheel and are preferably formed of selected maple and spruce wood of approximately one-eighth inch thickness and of a shape approximately as shown in Figure 7, it being understood that the shape of the member 20 corresponds with the varying sizes of the tone chambers although the overall length remains approximately the same as they all reach from the approximate center of the opening 11 to the rim of the bowl 10. Thus, the structural member 20 forms one of the four sides of the tone chamber shown in detail in Figure 6 of the drawings.

As described thus far, the loudspeaker comprises the bowl 10 having positioned in the opening 11 thereof the spiral assembly of tone chambers 12 and 12A which face alternately into the bowl and away from the bowl and which receive their sound from the receiving unit 19 with which they indirectly connect by way of the chamber 16 which encloses the multiplicity of small tubes 17. In order that means may be provided for reproducing sound waves of lower frequencies, a secondary sound reproducing assembly is positioned well within the bowl 10 and preferably at the exact focal point of the parabola thereof, as best shown in Figure 1 of the drawings, and comprises a circular baffleboard 32 suspended within the bowl so as to leave adequate clearance for sound waves to pass around it and carrying in its center a dynamic cone sound reproducing unit 33 filtered electrically to pass only sound waves of lower frequencies. As illustrated in Figure 1 of the drawings, the dynamic cone 33 is positioned in an opening of approximately equal size in the baffleboard 32 and faces the innermost end of the bowl 10. The circular baffleboard 32 is provided with a plurality of various sized openings around and about the dynamic cone 33, in which openings are positioned a plurality of tubes 34 of various lengths and diameters arranged so that longer tubes of larger diameter are positioned nearer the center opening of the baffleboard 32 than the shorter tubes of lesser diameter which are positioned in a graduated arrangement outwardly toward the edges of the baffleboard 32. These tubes are preferably formed of thin walled metal pipe and are open at both ends, the longest tubes being preferably about thirty-six inches in length and anchored to the circular baffleboard at approximately the middle of the tube. The tubes graduate evenly in diameter and length, the shortest and smallest tube being preferably about twelve inches long. Each tube therefore possesses a different frequency response and, by referring to Figure 4 in which a front plan view of the baffleboard and the varying tubes may be seen, it will be observed that they are arranged in a pattern radiating spirally from the center opening of the baffleboard 32 and each one, therefore, establishes its own individual focal point or source of sound diffusion from different areas of the reflecting parabola comprising the innermost end of the bowl 10. In order to obtain adequate low frequency response from a cone diaphragm such as used, the baffleboard 32 is of suitable size so as to prevent the sound waves emanating from the front of the cone interfering with the waves emanating from the back. As shown in Figure 1 of the drawings, the outside area of each of the tubes 34 combines with the baffle area of the circular baffleboard 32 to create a baffle of a very large capacity and consequently is capable of faithfully handling the lowest notes the human ear is capable of interpreting. The tubes 34, positioned as described through the circular baffleboard 32, have an additional effect in that, while the sound waves from the front of the diaphragm are reflected in undiminished form and without "boom" as a result of the reflection characteristics of the parabolic shape of the bowl 10, the sounds will also flow through the system of tubes 34 which also act as acoustic neutralizers. These tubes 34 resonate in a different frequency depending upon their individual size and length and, due to the large number of the tubes 34 and the fact that their resonant points are so close together, the "acoustical impedance" is substantially non-resonant and therefore the acoustic resistance is practically that of free air. Thus, the circular baffleboard in connection with its associated series of tubes 34 has a dual capacity of acting as a baffle and also becomes a multi-cavity resonator under the influence of the parabolic interior of the bowl 10. The tubes 34, being properly proportioned and distributed, act as acoustical dampeners and tend to neutralize the acoustic compliances of the parabola itself. By this interaction between the acoustic compliances and the acoustical inertances, the sound wave from the back of the dynamic cone 32 is caused to flow from the tubes 34 "in phase" with the front wave, so that there is no cancellation of wave motion, but rather a reinforcement or amplification of sound waves thus effecting a considerable increase in efficeincy and brilliancy of tone, besides that of amplification. The net result is a specific and definite improvement in the overall reproduction of sound, characterized by the production of deep, low tones of great resonance, brilliance and distinction without "boom" or unnatural flat tones which are devoid of character.

By referring to Figures 10 and 11 of the drawings enlarged detailed illustrations of a resonance creating device forming a part of a loudspeaker, and more particularly a part of each of the tone chambers 12 and 12A, may be seen. This resonance creating device is positioned in each of the tone chambers 12 and 12A on the tongue 26 as is clearly shown in Figures 6 and 8 of the drawings. The resonance creating device comprises a mounting bracket 35, preferably iron or heavy metal, attached to the tongue 26 of the tone chambers 12 and 12A in a manner so that a pair of tubes are supported in elevated relation to the tongue 26 thereby. These tubes comprise a thin wall resonant metal tube 36 and a thicker wall iron tube 37. The tube 37 is approximately one-third smaller in size than the tube 36, and as best shown in Figure 10, is, in effect, suspended within the tube 36 by means of the heavy metal bracket 35. Screws 38 position the tubes upon a circular projection of the bracket 35 which immediately surrounds an opening 39 therein which is in alignment with the interior of the tube 37. The tube 37 has attached to its forward end a coil of spring wire 40, larger in diameter than the tube 37 and positioned thereabout and comprising a plurality of turns. The coil 40, attached at one end thereof to the forward end of the iron tube 37 is, therefore, held in suspension about the tube 37. This structure, mounted upon the tongue 26 in each of the tone chambers 12 and 12A wherein the tongue 26 itself is mounted by a three-point suspension with respect to the tone chamber structure, is highly responsive to sound vibration and will be effected thereby sympathetically as, for example, by the sounds that are received in the tone chamber, and create within the chamber a superabundance of resonance which tends to amplify and neutralize sound vibrations introduced into the tone chamber making the output sounds clear-cut, decisive, and rich in resonance. By varying the size of the respective parts of this resonance creating device which comprises the thin wall resonant metal tube 36 and the thicker wall iron tube 37 and the coil 40, it is possible to control as to tone the resonance of each complete tone chamber and, correspondingly, the whole group of tone chambers as they relate to the entire frequency ranges desired.

In constructing a sound reproducing apparatus in accordance with this invention it is obvious that certain modifications are possible as, for example, such a desirable modification relates to a modified form of secondary sound reproducing means positioned within the parabolic bowl of the loudspeaker and intended to radiate original sound waves of the lower frequencies only. By referring to Figures 3 and 12 of the drawings, it will be observed that the modified form of secondary sound creating apparatus comprises an alternate arrangement for the dynamic cone reproducing unit 33 and its associated circular baffleboard 32 and plurality of tubes 34 heretofore described and, further, that this modified form of secondary sound reproducing apparatus comprises a dynamic cone 41 positioned on the lower inner surface of a loudspeaker formed in accordance with this invention and comprising a bowl 43 having a frontal opening 44 therein. Still referring to Figure 3 of the drawings, it will be observed that the bowl 43 is in all respects similar to the bowl 10 heretofore described, and that, positioned within the opening 44 thereof, there is a tone chamber assembly similar in all respects to the assembly comprising the tone chambers 12 and 12A heretofore described. The secondary sound reproducing unit, comprising the dynamic cone 41, having a perforated disk 42 covering an opening 43 of the dynamic cone 41, is provided with a plurality of sound directional thin walled metal tubes 45 of varying lengths and varying diameter and wall thickness each of which is individually supported by the perforated disk 42, as illustrated, and arranged so that the larger and longest tubes are in uppermost position and the shortest and smallest are in lowermost position, the tubes being graduated as to length so that their total structure and grouping at their ends forms a substantially perpendicular line at the focal point of the reflecting surface of the bowl 43. Thus, sounds introduced in the directional series of resonating tubes are directed upwardly and outwardly thereof through the plurality of tubes 45 which in turn direct these sounds into a desirable area of the parabolic bowl 43 as heretofore described. It will be obvious that by varying the position, size, and sound delivering angle of this modified form of secondary sound reproducing apparatus within the parabolic bowl 43, adequate low-frequency response may be obtained and that the sound waves emanating from the front of the dynamic cone 41 are reflected in undiminished form and without "boom" as a result of the reflective characteristics of the parabola shape of the inner end of the bowl 43 and further, that the sounds, flowing as they do through the system of tubes 45 of varying diameters and size, resonating at different frequencies depending upon the size and diameter of each of the tubes 45, cause the sounds from the cone to flow from the tubes "in phase" so that there is no apparent cancellation of wave motion and instead a reinforcement or amplification of the sound waves is effected, resulting in a considerable increase in efficiency and brilliancy of tone. It will be obvious that modifications in the arrangement of the tone chambers 12 and 12A are also possible as, for example, varying members of the tone chambers may face inwardly or outwardly of the reflecting surface of the bowl of the loudspeaker or all the tone chambers might be faced inwardly or outwardly if found desirable.

It will thus be seen that the apparatus for amplifying and stabilizing sound waves disclosed herein possesses several advantages over the various forms of devices for this purpose heretofore known to the art in that, in amplifying and radiating sounds where the intensity is required to be of heavy volume, the disclosed apparatus will radiate sounds that retain, in amplified form, all of the true structure and delicacy of tone in the originating sounds at the microphone or other originating source, and that these tones will not have sacrificed, lost, or added to them extraneous sound variations and, further, that the radiated sounds will consist of excessive resonance or "depth" so as to radiate with the same degree of intensity and clarity to the most distant parts of an auditorium as to those nearer sections thus reducing to a great extent or limiting entirely the possibility of reverberation, echo, or "dead spots" and possessing as a distinct feature the ability to create, sustain, and terminate resonance of the exact characteristics of time and quality delivered from the associated input electrical circuits. It is obvious that modifications other than those described may be made within the scope of the invention as, for example, in the reproduction of sound in enclosures of relatively small area, the tone chamber assembly of alternate inwardly and outwardly facing tone chambers heretofore described might be used without the secondary sound reproducing mechanism and without the parabolic bowl in which event the tone chamber assembly would be modified in design so as to be capable of installation in an area of shallow depth immediately behind, for example, a motion picture projection screen.

Having thus described my invention, what I claim is:

1. An acoustical device comprising a producing source of sounds, a bowl shaped sound reflecting member open to the atmosphere at one end, resonators positioned at the open end of the said sound reflecting member some of the said resonators arranged to face into the said sound reflecting member and some arranged to face outwardly away from the said sound reflecting member, the said sound reflecting member being shaped to divert and distribute inwardly directed sound waves in an outward direction from the said device, the said resonators being positioned radially about and communicating with the said producing source of sounds.

2. An acoustical device comprising a bowl shaped sound reflecting member open to the atmosphere at one end, a sound source, resonators positioned at the open end of the said sound reflecting member, some of the said resonators arranged to face into the said sound reflecting member and some arranged to face outwardly away from the said sound reflecting member, the said reflecting member being shaped to divert and distribute inwardly directed sound waves in an outward direction from the said device, the said resonators communicating with the said sound source.

3. An acoustical device comprising a bowl shaped sound reflecting member open to the atmosphere at one end, a sound source, resonators positioned within the said open end of the said sound reflecting member, said resonators arranged to face both into the space partially enclosed by the sound reflecting member and outwardly away from the said device, the said sound reflecting member being shaped to divert and distribute inwardly directed sound waves in an outward direction from the said device, the said resonators being positioned radially about a point centrally located with respect to the said open end of the said sound reflecting member, the said resonators arranged so that alternate resonators face toward the said sound reflecting member of the device.

4. An acoustical device comprising a bowl shaped sound reflecting member open at one end, the said sound reflecting member having an approximate focal point located within the area partially enclosed thereby, a sound source, resonators positioned in the open end of the said sound reflecting member, said resonators arranged to face both toward the said sound reflecting member and away from the said device, the said sound reflecting member being shaped to reflect inwardly directed sound waves in an outward direction toward the said resonators, a baffle positioned within the said bowl shaped sound reflecting member in a manner so as to provide a sound passage between the periphery of the baffle and the inner surface of the said reflecting member, an opening formed in said baffle, lower frequency sound producing means positioned on the said baffle adapted to deliver sounds through the said opening, together with a plurality of tubular resonators positioned through the said baffle each of the said tubular resonators supported by the said baffle at a point inwardly from the ends of the said tubular resonators.

5. An acoustical device comprising a bowl shaped sound reflecting member forming an enclosure open to the atmosphere at one end, the said reflection member having an approximate focal point located within the said enclosure, a sound source and a plurality of resonators in communication therewith positioned in the open end of the device, said resonators arranged to face both toward the said sound reflecting member and away from the said sound reflecting member, the said reflecting member being shaped to divert and distribute the said inwardly directed sound waves in an outwardly direction toward the said sound source and resonators, a circular baffle positioned within the said bowl shaped sound reflecting member in a manner so as to provide a sound passage between the periphery of the circular baffle and the inner surface of the reflecting member, an opening formed in said circular baffle, lower frequency sound producing means adapted to deliver sounds through the said opening, together with a plurality of tubular resonators of varying sizes positioned through the said circular baffle each of the said tubular resonators supported by the said baffle at a point inwardly from the ends of the said tubular resonators.

6. An acoustical device comprising a bowl shaped sound reflecting member forming an enclosure open to the atmosphere at one end, the said sound reflecting member having an approximate focal point located within the said enclosure, sound producing means positioned in the said device, resonators arranged to face both into the said enclosure and outwardly away from the said device, said resonators in communication with said sound producing means, and lower frequency sound producing means positioned within the bowl shaped sound reflecting member and including a group of parallel open-ended tubular resonators directed at the said approximate focal point, through which the said lower frequency sound waves are directed to the said focal point of the bowl shaped sound reflecting member.

7. The combination in an acoustical device of a bowl shaped sound reflecting member forming an enclosure open to the atmosphere at one end, the said sound reflecting member having an approximate focal point located within the said enclosure, sound producing means including a plurality of resonators positioned near the said open end of the device arranged to face both into the said sound reflecting member and outwardly away therefrom, and lower frequency sound delivering means positioned within the said sound reflecting member comprising a lower frequency sound source and a group of parallel open-ended tubular resonators facing the said approximate focal point, through which the said lower frequency sound waves are directed, the said plurality of open-ended tubular resonators being of varying lengths and dimensions.

8. The combination in an acoustical device of a bowl shaped sound reflecting member forming an enclosure open to the atmosphere at one end, the said sound reflecting member having an approximate focal point located within the said enclosure, normal to high frequency sound producing means including a plurality of resonators positioned near the said open end of the device arranged to face both into the said sound reflecting member and outwardly away therefrom, and lower frequency sound producing means positioned within the said sound reflecting member and comprising a sound translating device including a diaphragm and a group of parallel open-ended tubular resonators having their common ends terminating adjacent the said diaphragm and adapted to direct sound waves at the said approximate focal point of the said sound reflecting member.

9. In an acoustical device comprising a bowl shaped sound reflecting member forming an enclosure open to the atmosphere at one end, sound producing and resonance developing means positioned at the open end of the said device, and said means comprising a sound source and a plurality of tone improving horn like resonators in communication with the said sound source, each of which comprises a resonance chamber having sound input and sound emitting openings, a tongue positioned in each chamber, and a sound reflector located opposite the sound emitting opening of the said chamber.

10. In an acoustical device comprising a bowl shaped sound reflecting member forming an enclosure open to the atmosphere at one end, sound producing and resonance developing means positioned near the open end of the said sound reflecting member, said means including a plurality of tone improving horn like resonators in communication with the said sound source, each of which comprises a resonance chamber having sound input and sound emitting openings, a tongue positioned in each chamber and a sound reflector located opposite the sound emitting opening of the said chamber, together with resonance creating means positioned on each of the said tongues, said resonance creating means comprising a pair of tubular members one positioned within the other and both suspended from a mounting bracket, the inner one of the said tubular members having positioned thereabout and suspended therefrom a resonant coil.

11. The structure recited in claim 1, the resonators being of graduated sizes and arranged so that the radial curve formed by their outer-most ends forms a spiral.

12. The structure recited in claim 3, the resonators being of graduated size and arranged so that the radial curve formed by their outer-most ends forms a spiral.

13. A resonance device adapted to be used in acoustical devices and comprising a bracket having an opening formed therein and an annular flange formed about the said opening, a tubular member positioned on the said annular flange and a secondary tubular member, of larger diameter than the said tubular member, positioned on the said bracket and enclosing the said tubular member, a resonant coil attached to the outer-most end of the said tubular member and suspended thereabout.

14. A tone improving horn like resonator comprising an elongated tapered chamber having sound input and sound emitting openings, the said openings at right angles to one another, a tongue positioned in the said resonator, a supporting bracket for said tongue, arms formed on said tongue and adapted to engage the sides of the said resonator so as to support the said tongue, and a reflector positioned within the said resonator opposite the said sound emitting opening, the said reflector adapted to prohibit the entry of sounds into the said resonator by way of the said sound emitting opening.

HARRY N. RIDER.